United States Patent [19]

Katano

[11] Patent Number: 5,669,028
[45] Date of Patent: Sep. 16, 1997

[54] CAMERA EFFECTIVELY UTILIZING INTERNAL SPACE FOR DECREASING SIZE

[75] Inventor: Yuji Katano, Kawasaki, Japan

[73] Assignee: Nikon Corporation, Shinagawa-ku, Japan

[21] Appl. No.: 716,878

[22] Filed: Sep. 20, 1996

Related U.S. Application Data

[63] Continuation of Ser. No. 578,392, Dec. 26, 1995, abandoned, which is a continuation of Ser. No. 393,032, Feb. 23, 1995, abandoned, which is a continuation of Ser. No. 118,750, Sep. 10, 1993, abandoned.

[30] Foreign Application Priority Data

Sep. 11, 1992  [JP]  Japan  ................................. 4-243776

[51] Int. Cl.$^6$ ................................................ G03B 17/02
[52] U.S. Cl. ................................................ 396/535; 396/538
[58] Field of Search ................................ 396/535, 536, 396/538, 543

[56] References Cited

U.S. PATENT DOCUMENTS

| | | |
|---|---|---|
| 3,670,639 | 6/1972 | Harnden . |
| 4,688,916 | 8/1987 | Dobashi et al. ........................ 354/288 |
| 4,751,538 | 6/1988 | Konno ..................................... 354/288 |
| 4,855,782 | 8/1989 | Kobayashi et al. .................. 354/289.1 |
| 5,005,033 | 4/1991 | Miyasaka ............................. 354/289.1 |
| 5,128,704 | 7/1992 | Hayashi et al. ....................... 354/289.1 |

*Primary Examiner*—David M. Gray

[57] ABSTRACT

A camera having a cartridge compartment therein loaded with a film cartridge having a spool shaft projecting from an upper portion of the film cartridge. A switch is located in a space formed by an upper surface of the film cartridge, a side surface of the projecting portion of the spool shaft and an internal wall of the cartridge compartment. An operating member contacts the switch to operate the switch. The operating member partially projects from the camera back surface and is partially inserted into and operatively positioned in the space. The operating member is conveniently placed at a position on the camera surface for easy operation. Therefore, the switch is easily and conveniently operated and effective utilization of the internal space of the camera is employed to obtain a smaller size camera.

8 Claims, 4 Drawing Sheets

5,669,028

1

CAMERA EFFECTIVELY UTILIZING INTERNAL SPACE FOR DECREASING SIZE

This application is a continuation of application Ser. No. 08/578,391, filed Dec. 26, 1995, now abandoned, which is a continuation of U.S. Ser. No. 08/393,032, filed Feb. 23, 1995, now abandoned, which is a continuation of U.S. Ser. No. 08/118,750, filed Sep. 10, 1993, now abandoned.

BACKGROUND OF THE INVENTION

1. Field of the Invention

The present invention relates to a camera which uses a film cartridge, for example, a type 135 cartridge, having a spool shaft projecting from the film cartridge body. In particular, the present invention is directed to a camera wherein an operating member of the camera is located within a space formed between the spool shaft and a back cover of the camera.

2. Description of the Related Art

In recent years, accompanying the multifunctionalization of cameras, there has been a tendency towards increasing the types of camera switches and the number of camera operating members required to operate the various switches. The increased number of switches adds to the size of the camera or at least hinders it from being made smaller.

SUMMARY OF THE INVENTION

It is therefore an object of the present invention to provide a camera designed to have a smaller, more compact size.

It is another object of the present invention to provide a camera with the location of camera switches and operating members efficiently designed to employ all available space within the camera to reduce the size of the camera.

It is a further object of the present invention to provide a camera with the location of camera switches and operating members designed for ease of operation.

The above-mentioned objects are obtained by providing a camera with a switch and an operating member, wherein the switch is located in a space formed by an upper surface of a film cartridge body, a side surface of a projecting portion of a spool shaft projecting from the film cartridge body, and an internal wall of a film cartridge compartment. The operating member partially projects from the camera back and is partially inserted into the space in the camera body.

Because the switch is located in the space formed by the upper surface of the cartridge body, the side surface of the projecting portion of the spool shaft, and an internal wall of the film cartridge compartment and the operating member is partially inserted into the space, a smaller, more compact camera can be obtained.

These objects and advantages, together with other objects and advantages which will be subsequently apparent, reside in the details of the construction and operation of the invention as more fully hereinafter described and claimed, reference being had to the accompanying drawings forming a part hereof, wherein like reference numerals refer to like parts throughout.

2

Figure 3:
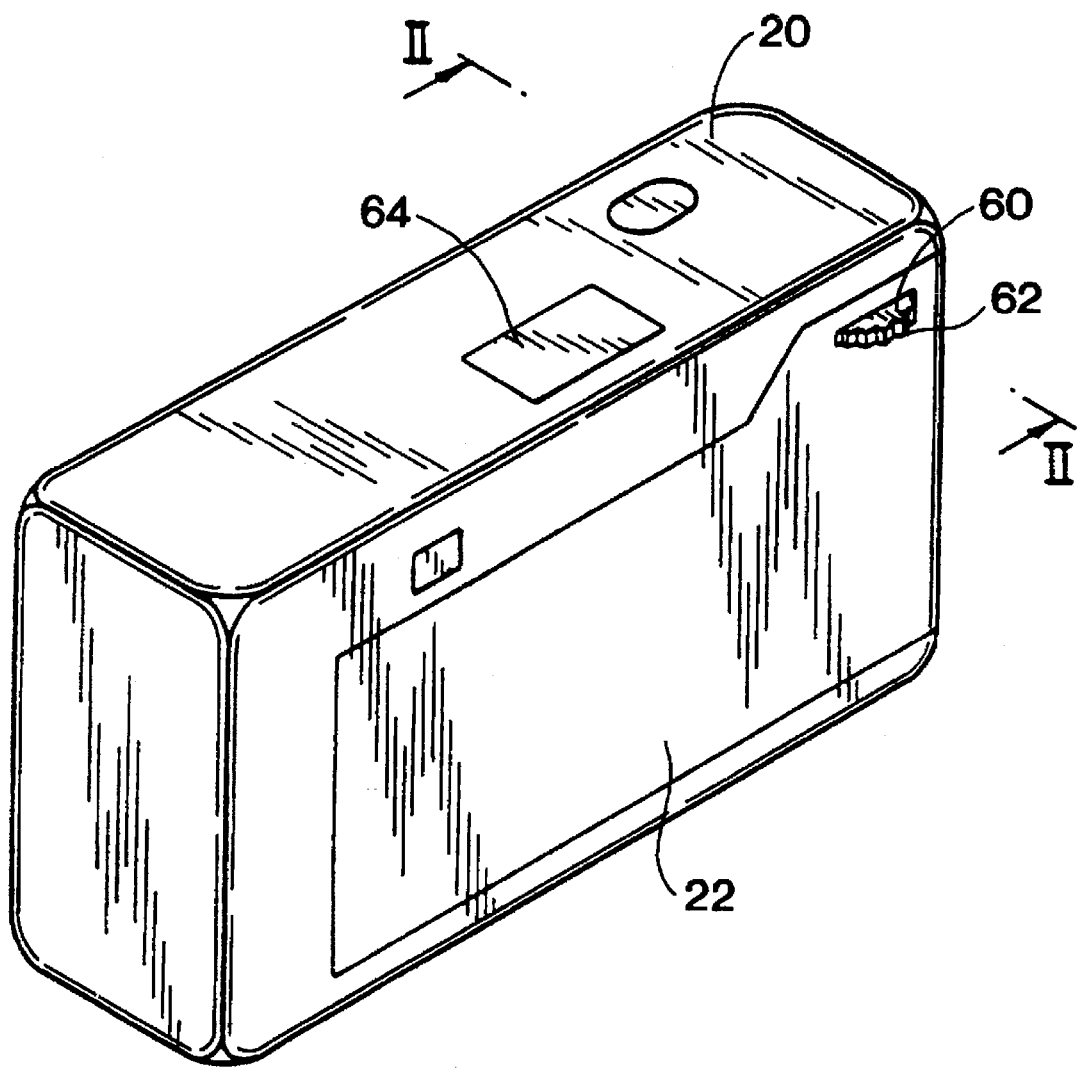
Figure 4:
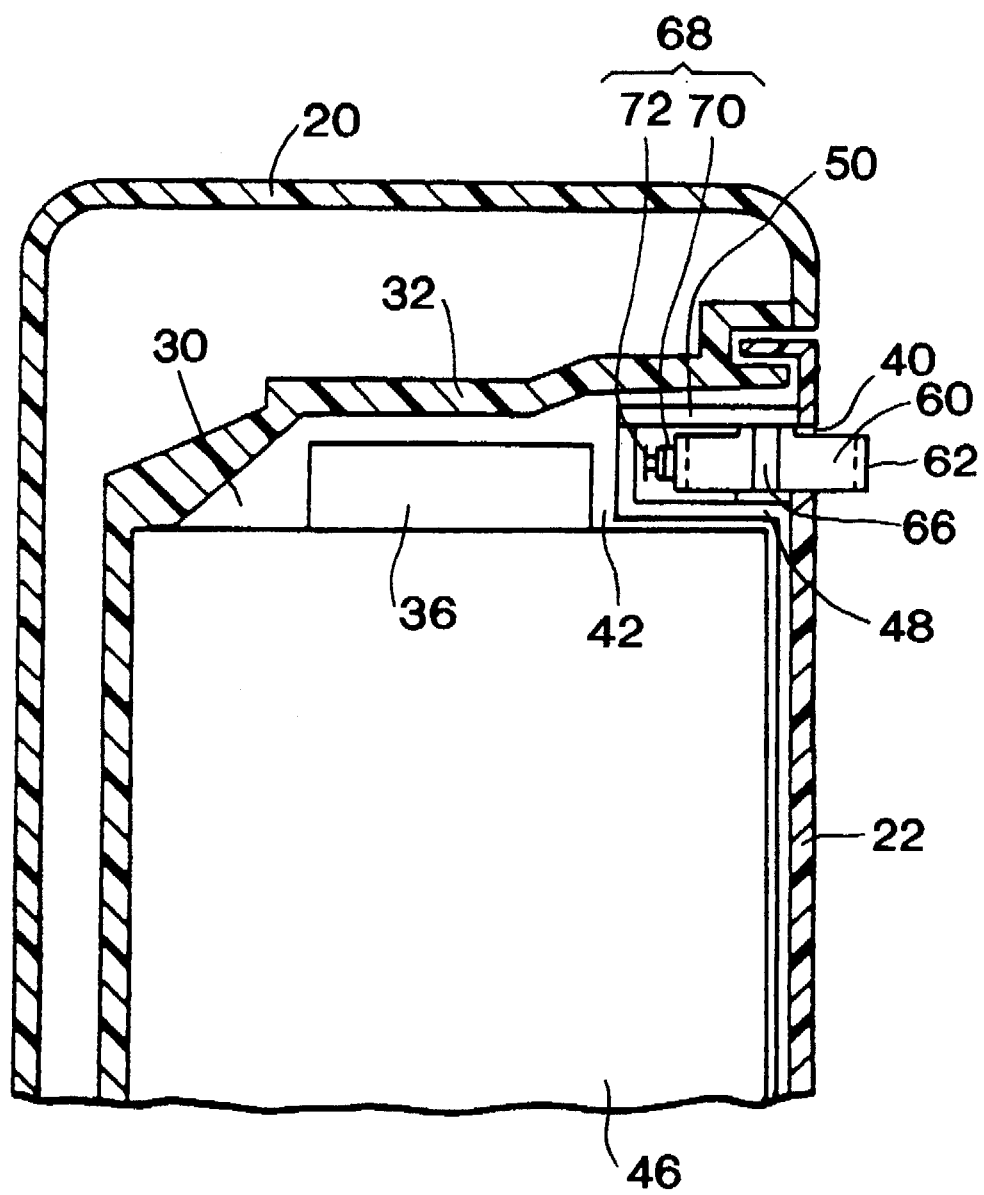

FIG. 3 is a perspective view from the rear of the camera according to a second embodiment of the present invention; and FIG. 4 is a partial cross-sectional view taken along the line II—II of FIG. 3, showing essential parts of the camera according to the second embodiment of the present invention.

DETAILED DESCRIPTION OF THE PREFERRED EMBODIMENTS

Details of the embodiments of the present invention are described below with reference to the drawings. Like reference numerals represent like parts throughout.

Figure 1:
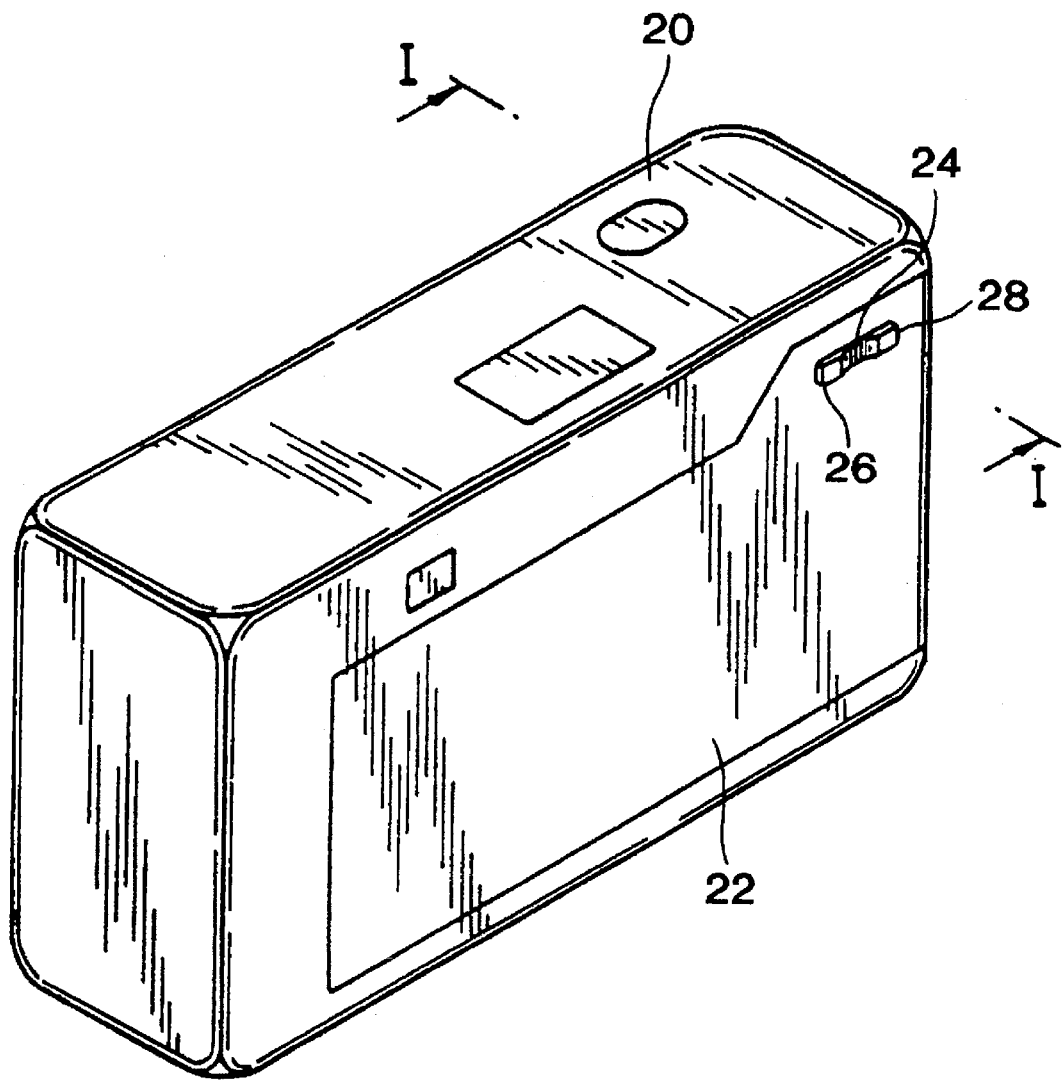
FIG. 1 is a perspective view from the rear of a camera, according to a first embodiment of the present invention.
Figure 2:
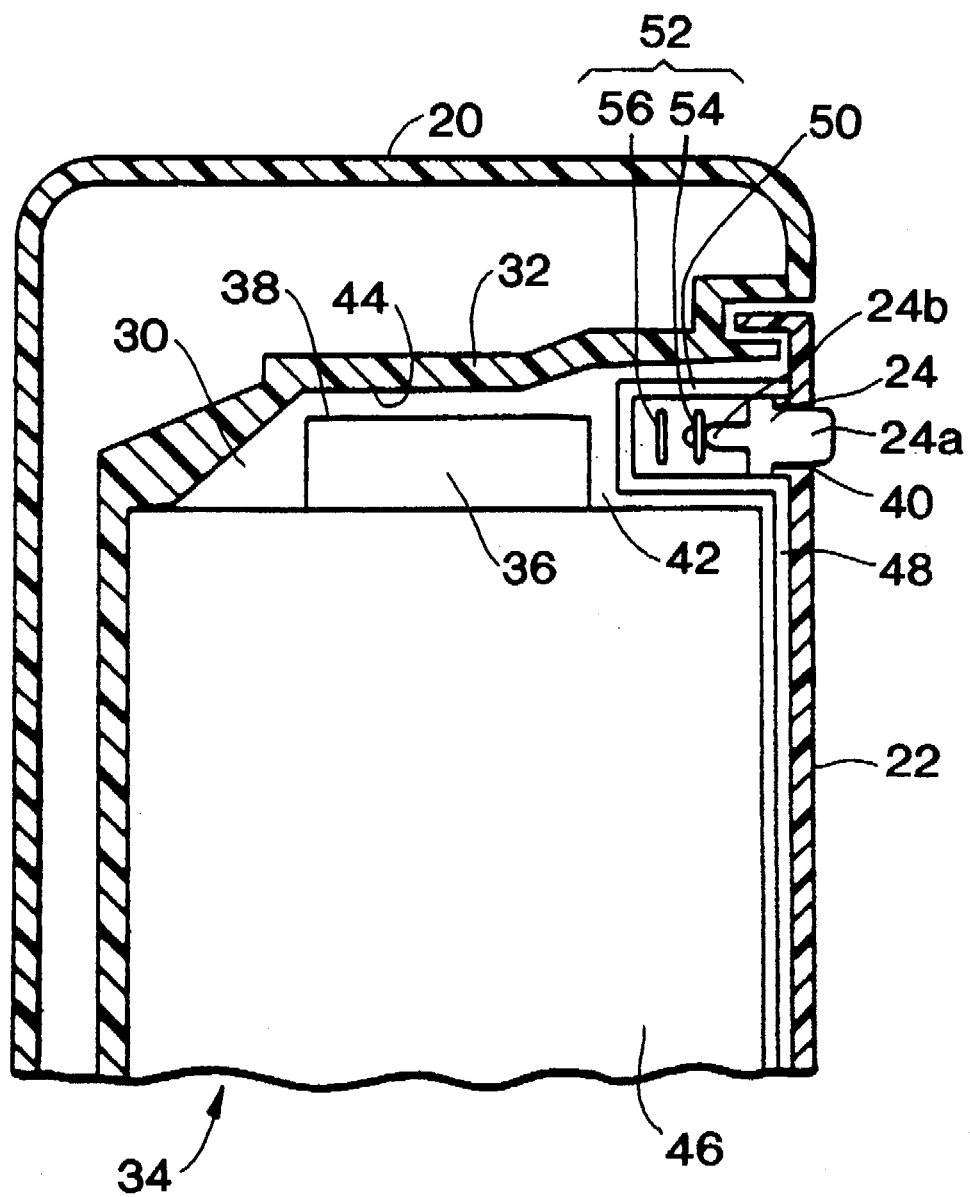
FIG. 2 is a partial cross-sectional view taken along the line I—I in FIG. 1, showing essential features of the camera according to the first embodiment of the present invention.

FIG. 1 is a perspective view from the rear of a camera according to a first embodiment of the present invention. FIG. 2 is a sectional view taken along I—I of FIG. 1.

In FIG. 1, reference numeral 20 denotes the camera body, reference numeral 22 denotes a back cover of the camera body 20 which is opened and closed when film is loaded. In the right-hand upper corner portion of the back cover 22, an operating member 24, for example a toggle type zoom button, is arranged such that, when a first end portion 26 of the operating member 24 is pressed, a photographic lens (not shown in the drawing) effects a "zoom in," and when a second end portion 28 of the operating member 24 is pressed, the photographic lens effects a "zoom out."

FIG. 2 is a sectional view of the camera taken along I—I in FIG. 1 and shows a cartridge compartment 30 formed by a frame member 32 within the camera body 20. A type 135 film cartridge 34, for example, is loaded into the cartridge compartment 30. The film cartridge 34 has a spool shaft 36 extending therefrom on which film is wound within the film cartridge 34. An upper portion of the spool shaft 36 projects into an upper surface of the cartridge compartment 30. This upper projecting portion of the spool shaft 36 is represented by reference numeral 38. When the film cartridge 34 is loaded into the cartridge compartment 30, a fork (not shown in the drawing), arranged to project into the cartridge compartment 30, cooperates with the upper projecting portion 38. After all the pictures on the roll are taken, or filming is complete, the fork is rotated which in turn rotates the spool shaft 36 via the upper projecting portion 38, and the film is re-wound.

An aperture 40 is formed in a portion of a space 42 enclosed by an internal wall 44 of the cartridge compartment 30, an upper surface 46 of the film cartridge 34, and a side surface of the upper projecting portion 38. Furthermore, a light shielding plate 48 is affixed to an inner surface of the back cover 22, and a hollow projecting portion 50 is formed by the light shielding plate 48 extending inwardly toward the spool shaft 36 of the film cartridge 34. The aperture 40 is at the entrance of the hollow projecting portion 50. A switch 52 formed from contact members 54 and 56 is arranged in the interior of the hollow projecting portion 50. The switch 52 is formed, for example, as a "zoom out" switch, but only a portion is shown in FIG. 2. The operating member 24 is slidably and operatively positioned or inserted in the hollow projecting portion 50 to contact the switch 52. The operating member 24 has at one end a head 24a projecting externally from the aperture 40 formed in the back cover 22, and has at the other end a point 24b projecting internally toward the switch 52. The head 24a of operating member 24 has the first portion 26 and second portion 28 formed thereon to constitute the toggle type zoom button.

When one end portion 26 or 28 of the operating member 24 is pressed from the rear side of the camera body 20, the above-mentioned contact pieces 54 and 56 contact each other and perform a "zoom in" or a "zoom out" operation. Only one operation is performed at a time. That is, both switches are not ON at the same time.

When the back cover 22 is closed, a contact point on an exterior portion of the back cover 22 makes contact with a contact point (neither of the contact points are shown in the drawings) on an interior portion of the camera body 20. When these contact points meet, the ON and OFF signals of the above-mentioned operating member 24 are input to a well known circuit (not shown) in the camera body. When an ON signal is input, a "zoom in" or "zoom out" of a photographic lens is performed by the circuit on the camera body side. Moreover, when the back cover 22 is opened, the operating member 24 and the switch 52 move integrally with the back cover 22.

Because the switch 52 and the operating member 24 are located in the space 42, enclosed by the upper surface 46 of the film cartridge 34, the side surface of the upper projecting portion 38 and the internal wall 44 of the cartridge compartment 30, and the switch 52 is formed such that pressing the operating member 24 from the back surface to the camera operates the switch 52, the space 42 is effectively made use of. The space 42 is not used in prior art cameras. Furthermore and in particular, in the first embodiment of the present invention, because the position in which the operating member 24 is located is shown in FIG. 1 to be on a right-hand upper portion of the back cover 22, when the camera is ready to take a picture it is easy to operate the operating member 24 with the right thumb of the camera user. This provides the advantages of an increased ease of operation in addition to reducing the size of the camera.

FIGS. 3 and 4 show a second embodiment of the present invention in which a dial-type operating member 60 is used instead of the toggle-type operating member 24 used in the first embodiment. The same reference numerals used in FIGS. 3 and 4 as in FIGS. 1 and 2 refer to like parts. The description for the second embodiment of FIGS. 3 and 4 set forth below is directed only to points of difference between the first embodiment shown in FIGS. 1 and 2 and the second embodiment shown in FIGS. 3 and 4.

The dial-type operating member 60 denotes, for example, a dial for setting an exposure control mode. The dial-type operating member 60 is arranged at a right-hand upper corner of the back cover 22. Corrugations 62 are formed on the circumference of the dial-type operating member 60. Reference numeral 64 is a liquid crystal display device arranged in a top surface of the camera body 20. A mode setting state and the like are indicated on the liquid crystal display 62.

As shown in FIG. 4, the dial-type operating member 60 is operatively arranged to be pivoted by a shaft 66 located within the hollow projecting portion 50 formed by the space 42. The dial-type operating member 60 partially extends externally from the aperture 40 and is partially positioned within the space 42. On the other hand, a switch 68 is arranged within the hollow projecting portion 50. The switch 68 includes the corrugations 62 of the dial-type operating member 60, a cooperating contact piece 70 and a contacting contact piece 72. Electrical pulse signals are generated by the repetition of contact and non-contact of the contact pieces 70 and 72 accompanying the rotation of the dial-type operating member 60. These pulse signals are input to components in the interior of the camera body 20 in a well known manner, and accordingly, the camera exposure control mode is changed. In addition, a display of the set mode is output on the liquid crystal display 64.

The present invention provides a switch and an operating member for a camera located in a space formed by an upper surface of a cartridge body, a side surface of a projecting portion of a spool shaft attached to the cartridge body, and an internal wall of a cartridge compartment. The switch is operated by means of an operating member conveniently located on a back surface of the camera body. Because effective use is made of the space inside the camera body, which is not used in the prior art cameras, the camera can be designed to be smaller than those in the prior art.

Further, in the above-mentioned first and second embodiments, switches using, for example, the contact pieces 54, 56, and 70 and 72 are adopted. However, any type of switch or contact pieces such as, for example, an encoder using a printed base and metal brushes, or switches using a photoreflector and a non-contact element, may be employed. Accordingly, the constitution and shape of the operating member are also not limited by the embodiments as set forth above. In addition, the application of the switch is not limited to a zoom or exposure setting control mode, and, for example, may be used for other camera functions, such as setting a flash mode or a range finder mode.

The foregoing is considered as illustrative only of the principles of the present invention. Further, since numerous modifications and changes will readily occur to those skilled in the art, it is not desired to limit the invention to the exact construction and application shown and described for the above embodiments, and accordingly, all suitable modifications may be resorted to, falling within the scope of the invention and the appended claims and their equivalents.

What is claimed is:

1. A camera comprising:

a camera body;

a cartridge compartment formed inside said camera body and including internal walls;

a film cartridge loaded into said cartridge compartment, said film cartridge having a spool shaft projecting from one end of the cartridge;

a space inside said cartridge compartment defined by a surface of said film cartridge, a side surface of said spool shaft, and an internal wall of said cartridge compartment;

a switch located in said space; and an operating member operatively coupled to said switch for operating said switch, said operating member partially projecting externally from a back surface of the camera body and partially positioned in said space.

2. A camera according to claim 1, further comprising a light shielding plate for enclosing said space.

3. A camera according to claim 2, wherein said back surface of the camera body includes a back cover and said light shielding plate is affixed to an inner surface of said back cover and has a hollow projecting portion extending into said space for housing said switch and partially receiving the operating member.

4. A camera according to claim 1, wherein said operating member comprises a toggle-type switch.

5. A camera according to claim 4, wherein said switch comprises first and second contact members.

6. A camera according to claim 1, wherein said operating member comprises a dial-type switch.

7. A camera according to claim 6, wherein said dial-type switch includes corrugations thereon and a shaft for rotating said switch.

8. A camera according to claim 7, wherein said switch comprises first and second contact members.

* * * * *